G. C. WORTMAN.
RAIL BRACING SPIKE RETAINER.
APPLICATION FILED MAR. 1, 1919.
1,344,109.
Patented June 22, 1920.
3 SHEETS—SHEET 1.
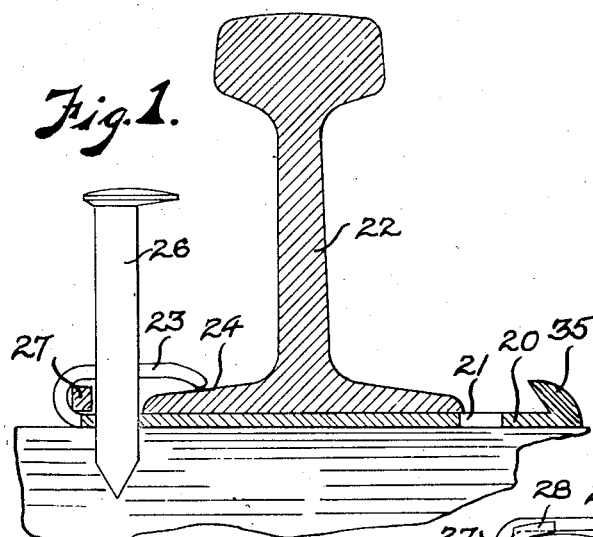
Fig. 1.
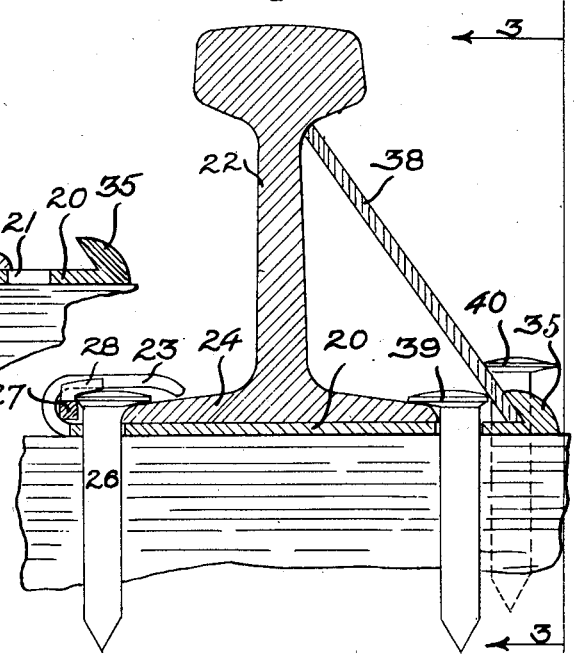
Fig. 2.
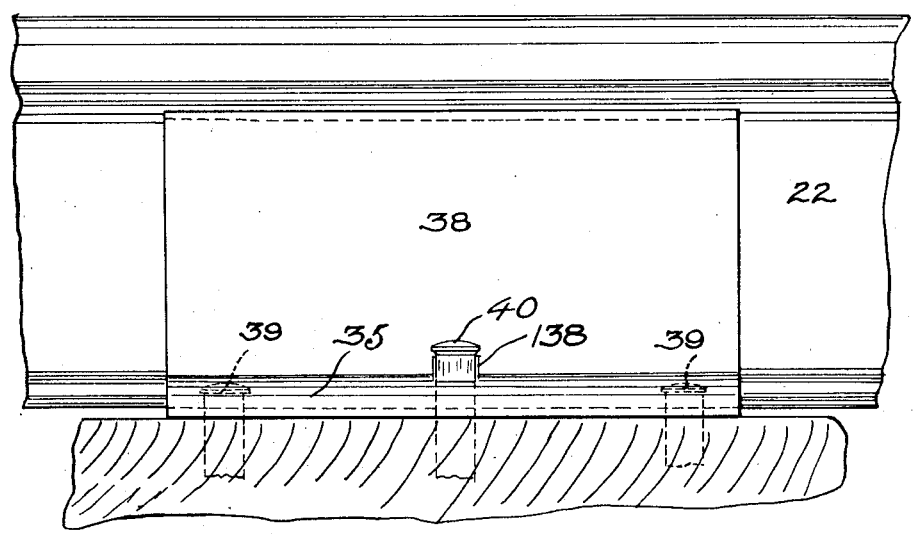
Fig. 3.
Inventor
G. C. Wortman
By
Attorney G. C. WORTMAN.
RAIL BRACING SPIKE RETAINER.
APPLICATION FILED MAR. 1, 1919.
1,344,109.
Patented June 22, 1920.
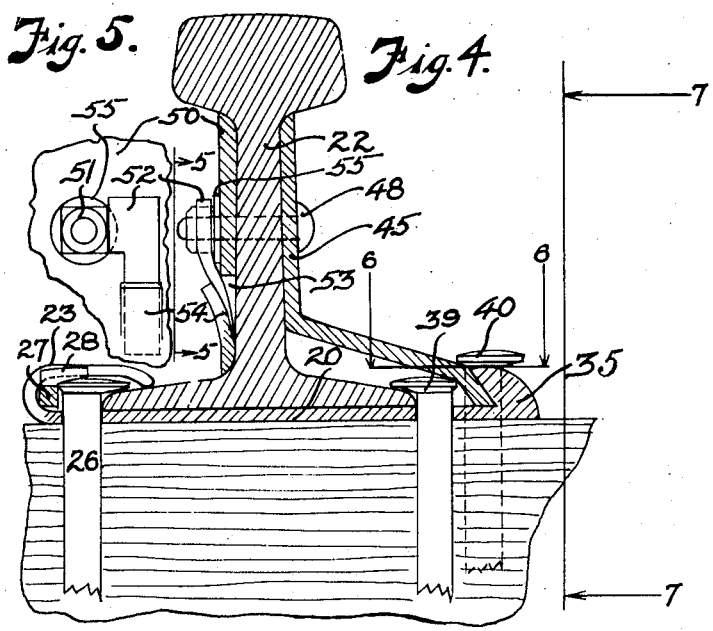
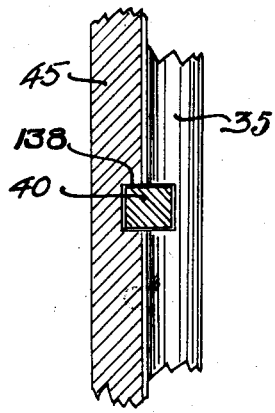
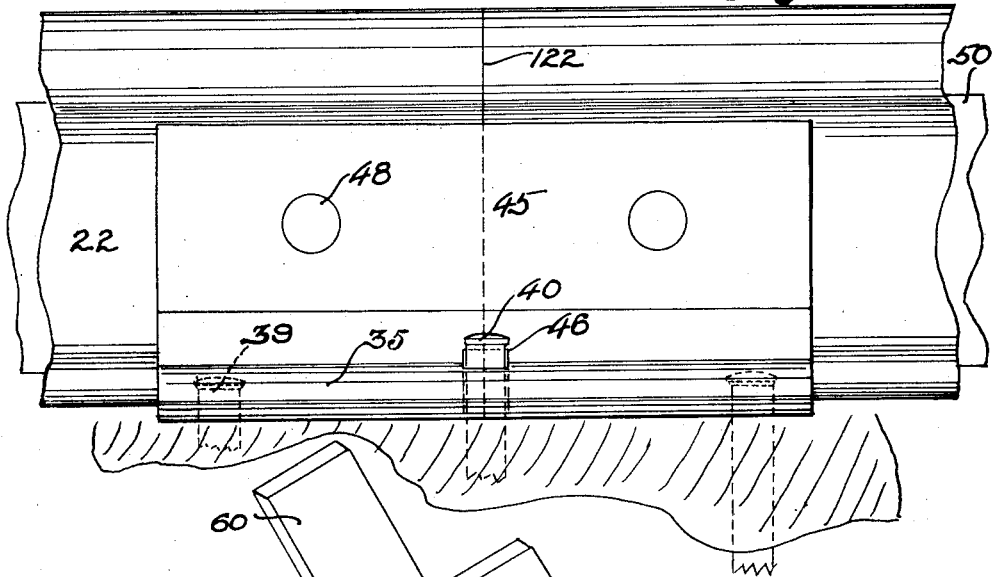
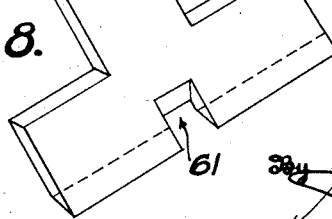

G. C. WORTMAN.
RAIL BRACING SPIKE RETAINER.
APPLICATION FILED MAR. 1, 1919.
1,344,109.
Patented June 22, 1920.
3 SHEETS—SHEET 3.
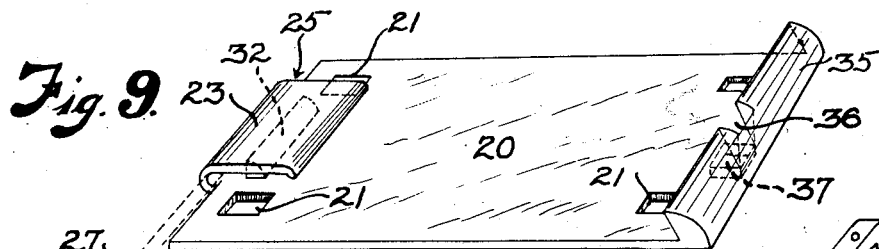
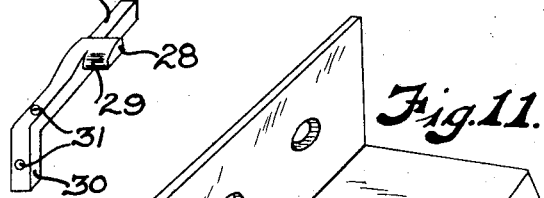
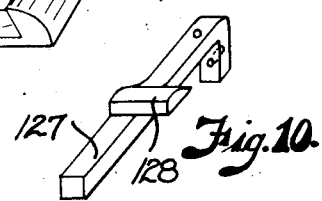
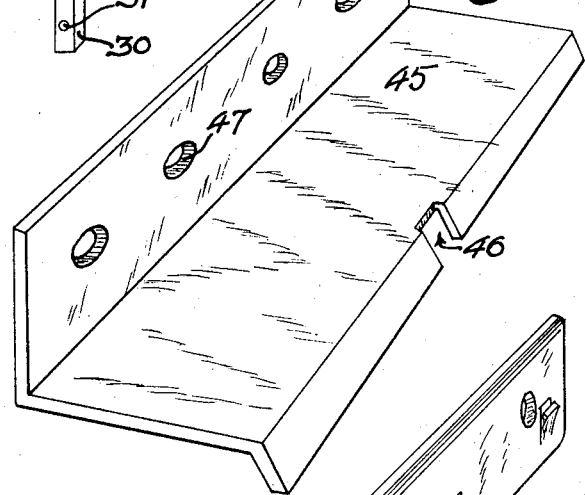
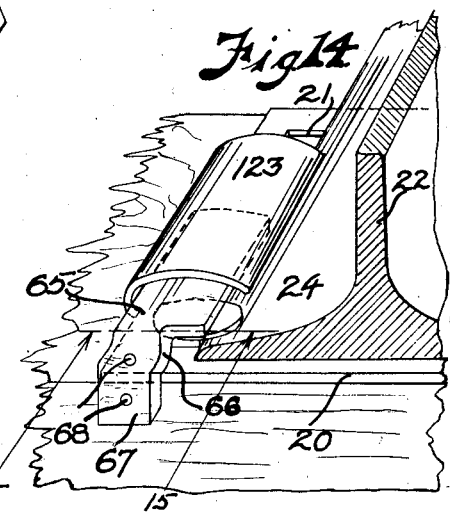
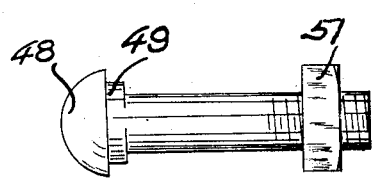
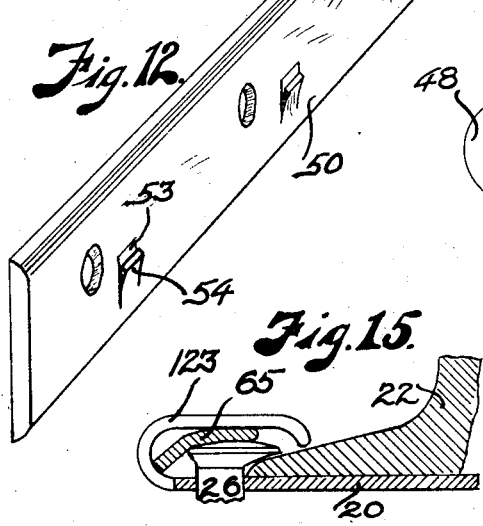
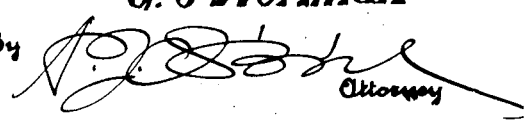
Inventor
G. C. Wortman
By
Attorney

UNITED STATES PATENT OFFICE.

GEORGE C. WORTMAN, OF DENVER, COLORADO.

RAIL-BRACING-SPIKE RETAINER.

1,344,109.  Specification of Letters Patent.  Patented June 22, 1920.

Application filed March 1, 1919. Serial No. 280,138.

*To all whom it may concern:*

Be it known that I, GEORGE C. WORTMAN, a citizen of the United States, residing at the city and county of Denver and State of Colorado, have invented certain new and useful Improvements in Rail-Bracing-Spike Retainers; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of the invention is to provide a device which will retain rail spikes in position against the rail flange, and brace the rail also.

Briefly, the invention comprises a tie plate, having spike holes near its corners and at one edge an overhanging lip, positioned between the adjacent spike holes. A key adapted to fit the bend between the lip and the plate has an overhanging head to engage the adjacent spike and retain it in position. The opposite edge of the tie plate has an upstanding undercut lug, adapted to engage the lower edge of a brace, or retaining plate, the upper edge of which engages under the ball of the rail and the lower portion of which engages the adjacent heads. The lower edge of the brace or retaining plate and the tie plate are apertured to receive a spike to prevent movement of the brace plate when positioned. In the drawings:

Figure 1 is a section through the rail and tie plate and showing the inner end of the key in position, the spike not being driven down.

Fig. 2 is a similar section, showing the spikes in position and also the key and the brace plate in position.

Fig. 3 is a side elevation indicated by line 3—3 of Fig. 2.

Fig. 4 is a section similar to that of Fig. 2, but showing a modified form of brace or retaining plate to be used at rail joints. This figure also shows means to prevent the turning of the nut on a bolt, which binds the brace plate.

Fig. 5 is a fragmentary elevation, indicated by line 5—5 of Fig. 4.

Fig. 6 is a horizontal section indicated in general by line 6—6 of Fig. 4.

Fig. 7 is an elevation from line 7—7 of Fig. 4.

Fig. 8 is a perspective of a modified form of brace plate.

Fig. 9 is a perspective, showing the tie plate and the key about to be moved into retaining position.

Fig. 10 is a perspective of a key to be used on the opposite side of the plate in Fig. 9.

Fig. 11 is a perspective of the retaining plate of Figs. 4 and 7.

Fig. 12 is a perspective of the fish plate of Fig. 4.

Fig. 13 is an elevation of the bolt used to secure the plates of Figs. 11 and 12, as shown in Fig. 4.

Fig. 14 is a perspective, showing a modified form of rail-engaging lip and the spike-retaining key associated therewith.

Fig. 15 is a vertical section on line 15—15 of Fig. 14.

The tie plate 20, having spike holes 21 at the corners thereof, is positioned under the rail 22, as is usual. The left edge, viewing the plate 20 as shown in the drawings, has an overhanging lip 23, the inner edge of which is adapted to approach or engage the flange 24 of the rail, as variously shown in the drawings. The sides of this lip 23 are cut away, as indicated at 25 in Fig. 9, to free the adjacent spike holes 21. A spike 26 is inserted through one of these holes and driven into position. The inner end of a key 27 is then inserted in the bend between the lip and the plate and the overhanging head 28 engages the head of the spike to retain the same, the outer edge of this head being beveled, as shown at 29. The outer end of the key is bent down at 30 and is provided with a hole 31 through which a spike or nail may be driven into the side of the tie to retain the key. Another hole 31 in the upper portion of the key may also be provided to receive a retaining nail or spike. In order that the inner end of the key may have no lateral motion in case nails are not driven in holes 31, an upstanding lug 32 is formed on the plate 20.

On the right edge of the tie plate 20, an upstanding lug, 35, is provided, this lug being undercut, as shown. At the center of the lug a vertical notch 36 is provided in connection with a hole 37 in the tie plate. The brace or retaining plate 38 is slid into position with one edge engaging the undercut portion of the lug 35 and the upper edge engaging the ball of the rail. In this position the lower portion of the plate engages the spikes 39, which hold the adjacent flange of the rail and prevent the spikes from rising from the tie. A spike 40 passes through the notch 36, and a corresponding notch 138 in the plate 38, and through the hole 37, into the tie. Until this spike 40 is withdrawn there can be no sliding motion of the plate, and therefore no withdrawal of the spikes 39.

In Fig. 4, a modified form of brace or retaining plate 45 is shown, the outer edge of this plate having a notch 46 to receive the spike 40 and the inner angular portion having elliptical apertures 47 to receive bolts 48, each of which has an elliptical shoulder 49. A bolt 48 passes through a fish plate 50 and is retained in position by means of a nut 51. To prevent the nut 51 from turning, a key 52, having a nut-engaging portion, has its lower end inserted in a slot 53, formed by striking up a tongue 54 from the plate. When the key is driven into position, the nut-engaging portion thereof positively prevents rotation of the nut. A washer 55 is shown in position between the fish plate 50 and the nut 51.

The form of retaining plate shown in Fig. 8 is patterned after that shown in Fig. 2, but is cut away at its sides to make it lighter, forming a rail-engaging section 60 while the lower edge is notched at 61 to receive the spike 40.

In Figs. 14 and 15 the overhanging lip 123 is positioned to be slightly above the head of the spike 26. An angular key 65, bent from a single piece of metal, is used in connection with this form and is driven into position under the lip 23 with the extending portion overlying the head of the spike. If desired, a lateral extension 66, having a depending portion 67, may be provided, these parts having holes 68 to receive nails or small spikes to retain the key, as in the other form.

Both forms of keys, 27 and 65, are designed to be a snug fit when driven into position behind the spike, so that it may be unnecessary to provide the extensions 30, 66 and 67 and the corresponding holes 31 and 68. Each of these keys is designed to have the inner portion extend about half way along the lips 23 and 123, so that a similar key may be driven in from the opposite side to retain a spike at the opposite corner of the plate.

In Fig. 10 a key, 127, to coöperate with the key 27 of Fig. 9 is shown, this key having an overhanging head 128 on the side opposite from the head 28 of Fig. 9, the reason for which is obvious. The head 28 of key 27 is beveled at 29, in order to present a smooth surface to the flanger on a snow plow, in case the flanger is positioned so low as to come in contact with these parts. The inner vertical face of the head 28 is designed to fit flush against the adjacent vertical face of the lip 23.

It is obvious that the parts in the form of Fig. 14 may also be beveled to accommodate the flanger on the snow plow, if desired.

The retaining plate of Fig. 11, and the fish plate of Fig. 12 are sufficiently long to furnish a firm binding mechanism at rail joints, as indicated at 122 on Fig. 7. While one bolt 48 is considered sufficient for each rail, two or more bolts may be used, as indicated by the apertures in the plates of Figs. 11 and 12, in case that extra strength is required.

This improvement is designed for the use of spikes at diagonally opposite corners only of the tie plate when the ties are new, as is common practice, and in this case only one of the keys 27 or 65 will be used. But when the ties become older and it is necessary to use four spikes, a second key may be used and inserted from the opposite side. The keys may be made in different lengths in order to accommodate tie plates and ties of different widths.

It is evident that with my improved construction, after the rails and ties sink under the weight of a passing train, when the rails rebound, the ties will be drawn up with the rails. This makes it easy for the section men to determine which ties need tamping, and it is unnecessary then to use a track-raising device, since the ties will always be up against the rails. Low joints also can be readily found. This makes it possible for the section men to tamp ties and true the tracks about twice as fast as they have been able to do heretofore.

The keys may also be retained by bolts passing through the ties or by other devices passing under the ties.

I claim:

1. A rail spike retainer, comprising a base plate having spike holes adjacent the corners thereof, an overhanging lip on one edge of said plate and positioned between the spike holes adjacent said edge, and a key to fit in the bend between the lip and the plate and having an overhanging part to engage the head of a spike in one of said holes to retain the same in position.

2. A rail spike retainer, comprising a base plate having spike holes adjacent the corners thereof, an overhanging lip on one edge of said plate and positioned between the spike holes adjacent said edge, and a key to fit in the bend between the lip and the plate and having an overhanging part to engage the head of a spike in one of said holes to retain the same in position, said key having a downwardly bent end adapted to be secured to the side of the tie on which the plate is used.

3. A rail spike retainer, comprising a base plate having spike holes adjacent the corners thereof, an overhanging lip on one edge of said plate and positioned between the spike holes adjacent said edge, a key to fit in the bend between the lip and the plate and having an overhanging part to engage the head of a spike in one of said holes to retain the same in position, and means under said lip to guide the inner end of said key and prevent lateral movement of the same.

4. A rail spike retainer, comprising a base plate having spike holes adjacent the corners thereof, an undercut lug on the upper face of said plate at one edge thereof and adjacent certain of said spike holes, and a flat plate adapted to be slid into engagement with the under face of said lug at one edge and to engage at the other edge one of the under sides of the ball of a rail held on said plate, and to engage and hold spike heads in said spike holes when in said position.

5. In combination with a rail, a base plate beneath said rail having holes adjacent the corners thereof, spikes in said holes having heads engaging the flange of the rail, a retaining plate of approximately uniform thickness and having an inclined portion, said plate having one edge in engagement with one of the under sides of the ball of the rail, and having the other edge in engagement with said base plate and with certain of said spike-heads, and means at the adjacent edge of said base plate to retain the lower edge of said retaining plate in position.

6. In combination with a rail, a base plate beneath said rail having holes adjacent the corners thereof, spikes in said holes having heads engaging the flange of the rail, a retaining plate having one edge in engagement with one of the under sides of the ball of the rail, and having the other edge in engagement with said base plate and with certain of said spike-heads, an undercut lug at the adjacent edge of said base plate to retain the lower edge of said retaining plate in position, the lower edge of said retaining plate and the inner edge of said lug each having a notch therein, and a spike through said openings to prevent movement of said retaining plate.

7. The combination with a rail, of a base plate beneath said rail, spike holes adjacent the corners of said plate, an overhanging lip on one edge of said plate and positioned between adjacent holes, a spike in one of said holes, and a key extending into and fitting the bend between the lip and the plate and having a member overhanging the head of said spike to retain the same in position.

8. The combination with a rail, of a base plate beneath said rail, spike holes adjacent the corners of said plate, an overhanging lip on one edge of said plate and positioned between adjacent holes, a spike in one of said holes, a key extending into and fitting the bend between the lip and the plate and having a member overhanging the head of said spike to retain the same in position, and an upstanding lug on said plate under said lip to hold the inner end of the key against lateral movement.

9. In combination with a rail, a base plate beneath said rail having holes adjacent the corners thereof, spikes in said holes having heads engaging the flange of the rail, a retaining plate having one edge in engagement with one of the under sides of the ball of the rail, and having the other edge in engagement with said base plate and with certain of said spike-heads, means at the adjacent edge of said base plate to retain the lower edge of said retaining plate in position, an overhanging lip on the opposite edge of said base plate and positioned between adjacent holes, a spike in one of said holes, and a key extending into and fitting the bend between the lip and the base plate, and having a member overhanging the head of the last mentioned spike to retain the same in position.

In testimony whereof I affix my signature.

GEORGE C. WORTMAN.